3,781,256
PROCESS AND INSTALLATION FOR THE PREPARATION OF HOMO- OR COPOLYMERS OF ETHYLENE
Constant P. M. Sadee, Brunssum, Christianus W. J. van Koppen, Sittard, and Henricus A. A. Koenders, Geleen, Netherlands, assignors to Stamicarbon N.V., Heerlen, Netherlands
Filed Nov. 29, 1971, Ser. No. 202,873
Claims priority, application Netherlands, Nov. 27, 1970, 7017347; July 21, 1971, 7110020
Int. Cl. C08f 1/60, 3/04, 15/00
U.S. Cl. 260—86.7
2 Claims

ABSTRACT OF THE DISCLOSURE

A process and apparatus is described to minimize the danger of aerial explosions which occur during the high pressure, high temperature polymerization of ethylenic monomers. The process involves rapidly discharging at least 0.3 kg. of water per kg. of reactor contents into the safety passageway and outlet pipe within 10 seconds following the operativeness of such safety passageway by the opening of valve means when an excessive pressure level is reached within the reactor. Various apparatus structures are also disclosed adapted for practicing this process wherein the water is held in rupturable bags or, e.g., is discharged into the escaping gas stream through valve-operated spray means, or in other ways.

---

The invention relates to a process and an installation for the preparation of homo- or copolymers of ethylenic monomers, wherein e.g. ethylene, or a mixture of ethylene and at least one other copolymerizable unsaturated organic monomer, is exposed to a high temperature and a high pressure in a reactor in the presence of an initiator, and, if a certain pressure is exceeded, at least part of the reactor contents is carried off along a route other than the normal discharge line, more specifically, via a safety unit, including a passageway and outlet that becomes operative when the excessive pressure level is reached.

The polymerization of ethylene is usually carried out at a temperature of 100–400° C. and a pressure of 500–5000 atm. in an autoclave or in a tubular reactor. The polymerization reaction releases a considerable quantity of heat (approximately 800 kcals./kg. of polyethylene formed), which must be rapidly carried off to prevent the temperature in the reactor from reaching the level at which the ethylene and, possibly, the polyethylene formed, decompose into carbon, hydrogen and methane. By converting only part of the ethylene feed to the reactor, the quantity of heat evolved can be limited, and also the heat so produced is carried off by the unconverted ethylene. Further, when use is made of a tubular reactor, a quantity of heat can be transferred to a cooling medium via the tube wall and carried off by said medium. Generally, about 10–30% of the ethylene led into the reactor is converted to polymer.

The unconverted ethylene monomer leaving the reactor is then expanded and separated from the polymer formed. Thereafter the monomer is cooled and passed through a purifying installation, for removing substances like solvents for the initiator and waxy polymerization products of low molecular weight, following which the purified ethylene is compressed again to the reactor pressure and returned to the reactor.

For reasons of economy it is desirable, however, for the reaction to be carried out in such a way that the ethylene conversion is as high as possible, which implies that the reaction conditions are maintained close to the critical point where the ethylene and, possibly, also the polyethylene formed, can decompose. Therefore, it may happen that if less heat is carried off, or if the hot mixture of ethylene and polymer present in the reactor is insufficiently mixed with the feed of ethylene, for instance as a result of polymer depositing on the reactor wall or on the stirrer, that the reaction conditions can locally reach or exceed said critical point and decomposition will then take place. The resulting decomposition reactions are themselves highly exothermic, viz

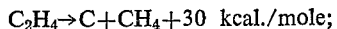$C_2H_4 \rightarrow C + CH_4 + 30$ kcal./mole;

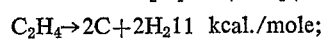$C_2H_4 \rightarrow 2C + 2H_2\ 11$ kcal./mole;

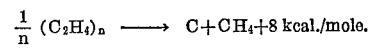$\frac{1}{n}(C_2H_4)_n \longrightarrow C + CH_4 + 8$ kcal./mole.

Thus, if the critical point is reached, the temperature and the pressure in the reactor will continue to rise rapidly. To prevent this condition from damaging the reactor, and to prevent the decomposition products from reaching the processing equipment connected to the reactor, the reactor itself and, possibly, also the product-separator are equipped with a safety unit, such as a rupture disc, which gives way if a certain pressure is exceeded, so that the contents of the reactor may escape through this safety unit.

The gases and solids thus escaping from the reactor at a high velocity after such a decomposition are highly inflammable, and, when issuing into the atmosphere, combine with air, forming an explosive mixture. Ignition of this mixture, the so-called "aerial," may be brought about by the factors inherent to the decomposition, viz the high temperature of the gases themselves, static charging of the polyethylene substance and soot, sparks and hot surfaces of solid parts ejected, and by external causes, such as lightning and torches. Among these causes of ignition, self-ignition through the high temperature of the gases themselves is the most important. This temperature depends on the reactor temperature and on the ratio between the formed products and ethylene. At a reactor temperature of 250° C. and a complete conversion of ethylene to methane and carbon the final temperature amounts to 1550° C., whilst it amounts to 680° C. at complete conversion to hydrogen and carbon. The temperature at which an explosive mixture of methane and air explodes spontaneously amounts to 600° C., and to about 500° C. in the case of a mixture of hydrogen and air. Analyses of the gas caught after a decomposition showed that it consisted of 85–90% of methane, from which it follows that a decomposition principally takes place towards $CH_4$.

It is also possible that the composition of the issuing gas changes with time and that an afterflow of a second gas will follow the first gas. The second gas will at the very first moment not have the temperature of the outlet line, i.e. the temperature of the preceding gas. If this temperature should be higher than its safe temperature, the second gas may also become ignited when mixing with air, and then ignite the cloud of the first gas which may not itself have yet been ignited. The quantity of the second gas need only be very small to cause this ignition of the first gas. The most unfavorable case occurs when primarily $CH_4$ issues from the reactor, as a result of which the outlet line may become heated to 1550° C. maximum, and secondarily an afterflow of $C_2H_4$ issues because of the decomposition being incomplete or because of the ethylene feed to the reactor not being cut off quickly. The temperature at which an explosive mixture of ethylene and air explodes spontaneously amounts to only about 425° C.

In practice it has appeared that 20 to 30% of the reactor decompositions lead to formation of an "aerial." In the case of an aerial which had a TNT equivalent of 21 kg. TNT, ⅓ part of the normal window panes within a radius of 135 m. succumbed. In this explosion about 2.5% of the available quantity of inflammable gases had detonated as TNT. However, this force of the explosion, observed by means of pressure measurements, amounts to only a fraction of the maximum TNT equivalent possible (1 kg. of TNT yields 1100 kcal.).

The TNT equivalent amounts, per kg. of $C_2H_4$, are the following:

In the case of an aerial after decomposition towards $H_2$— yields 4.1 kg. of TNT/kg. of $C_2H_4$, In the case of an aerial after decomposition towards yields 4.1 kg. of TNT/kg. of $C_2H_4$.

In the case of an aerial of $C_2H_4$— yields 10.3 kg. of TNT/kg. of $C_2H_4$.

In addition to the material damage which occurs, the noise attending such explosions is extremely annoying to the environs.

The present invention provides a process and an installation ensuring that the risk of ignition of the gases issuing from the reactor after a decomposition event is considerably reduced. This has been achieved, according to the invention, by introducing within 10 seconds after the safety device has come into action, at least 0.3 kg. of water per kg. of the reactor contents into the gas issuing from the reactor.

By preference, the water is introduced into the gas. As a result of the high heat of evaporation of water, a relatively small quantity thereof suffices to cool the gases, issuing from the reactor after the safety unit has become operative, to a temperature below that at which self-ignition takes place when the gases issue into the air. In the most frequent case, viz where in a decomposition the ethylene changes into carbon and methane, during which the temperature may rise to 1550° C., a water quantity of 0.3 kg. per kg. of the reactor contents suffices to cool the issuing gas to such a degree that the temperature of the gas, after mixing with such a quantity of air that an explosive mixture has been formed, lies below the ignition temperature of this mixture. In view of the risk that after a decomposition ethylene still issues from the reactor, which ethylene becomes heated by the hot outlet pipe to above its ignition temperature, preference should be given however to supplying an excess quantity of water, notably at least 0.8 kg. per kg. of the reactor contents.

Other coolants which may be considered are nitrogen and carbon dioxide. However, if these should be supplied in gaseous state, a quantity by weight is necessary which is 6.5 times as large as the quantity of water required to achieve the same cooling effect. In case liquid carbon dioxide is applied the required quantity is upwards of 4 times as large as the amount of water.

Depending on the reactor volume and the dimensions of the outlet, the reactor will drain in a few seconds. In general, the reactor will have emptied within 10 seconds, the major portion of the contents having left the reactor in a matter of 3 seconds.

Owing to the high velocity at which the gas leaves the reactor, the time lapse between the safety device becoming operative and the moment when the escaping gas arrives at the coolant feed device is extremely short. Depending on the dimensions of the outlet and the distance between the safety unit and said feed device, this time lapse amounts to approximately 50–100 milliseconds. Therefore, according to a preferred realization of the invention a number of holders filled with water is accommodated in the outlet pipe and/or in a compartment which is in communication with the outlet pipe, at least part of the wall of these holders being made of a material which gives way at the temperature and the pressure of the gases issuing from the reactor after the safety unit has become operative. These holders may be in the form of bags which are filled with water and are fixed one behind the other to a supporting device, such as a cable or a chain, installed in the outlet pipe. As material for these bags preferably a thermoplastic synthesis material is applied, such as polyethylene, which material will give way practically immediately after contact with the hot outlet gases. In case the bags are installed in the outlet pipe, practically all water present in them will be then added to the issuing gas during the initial part of the issuing period. The bags may also be accommodated in a tube section placed at an angle to the outlet pipe, the section being closed at the top and being in communication at the bottom, with the outlet pipe via a grid. In this case, first the water from the bags resting against the grid will flow ino the outlet pipe and only then the water from the bags lying further on, so that the supply of water is spread over a longer period. The duration of this period depends on the ratio between the diameter and the length of the tube section which is filled with bags. Tests have shown that this period, if the ratio between length and diameter is 1:1, amounts to about 3 seconds, which corresponds with the period of time during which the major portion of the reactor contents has flowed away. A delay in the water delivery can further be achieved by filling the tube section only partly with bags, so that in the case of a pressure increase a number of bags do not yield right away but shift in the tube section until crushed against the closure at the end of the tube section. The two measures, viz a number of bags in the outlet pipe to effectively cool the first blast of gas, and one or several tube sections filled with bags for cooling the gas subsequently issuing from the reactor, may also be applied jointly.

The tube section may also be installed in a bend of the outlet pipe, at the point where this pipe passes from a vertical part into a part which is mainly horizontal. Thus, the distribution of the water in the gas flow when the bags succumb will be better than will be the case if the tube section is installed in the vertical part of the outlet pipe. Of course, a number of tube sections, distributed across the length and the circumference of the outlet pipe, may be applied.

The volume of the holders may vary, for instance, from 50 cm.$^3$ to about 2 litres. If one wants to dilute the gas to such a degree that it cannot form an explosive mixture with air when issuing into the atmosphere, which mixture might explode upon contact with a hot object, for instance an open flame, a quantity of water is needed which is about ten times as large as the quantity required for cooling below the ignition temperature.

The water can also be distributed in the gas issuing from the reactor by means of sprayers, notably, and preferably, near the exit of the outlet pipe, as the pressure of the gas has decreased at this point to approximately atmospheric pressure. The supply may be effected via an annular slot around the exit of the outlet pipe, so that the gas issuing into the atmosphere is surrounded by a tubular water screen. The gas is thus shielded from the surrounding air and will, eventually, have absorbed and evaporated so much water from said screen that it is cooled and diluted to below the explosion limit. If desired, use may further be made of a central mist sprayer for cooling and diluting the front and the centre portions of the gas cloud.

The above described installation comprises a signalling device which links the safety unit with a valve installed in the sprinkler system, the said valve being of the type which, practically immediately after reception of the signal denoting that the safety unit has come into action, provides a large passage area. The said valve may be a quick-acting valve of a design known by itself. Preference is given to using a valve whose closing member comprises an explosive-operated rupture disc. Such a rupture disc carries an explosive charge which can be electrically ignited, thereby destroying the rupture disc. In this way the desired passage area is very rapidly created, while a simple construction is ensured by the lack of moving parts. Moreover, when the valve is in the closed position, no leakage can occur, a hazard which is not excluded in the application of a seated valve. Since after the occurrence of a decomposition considerable time is needed to render the reactor operational again, sufficient time will be available for installing a new rupture disc in the quick-acting valve, as well as for re-filling a water reservoir included in the sprinkler installation.

The invention will now be further elucidated with reference to the embodiments illustrated in the drawings.

Figure 1:
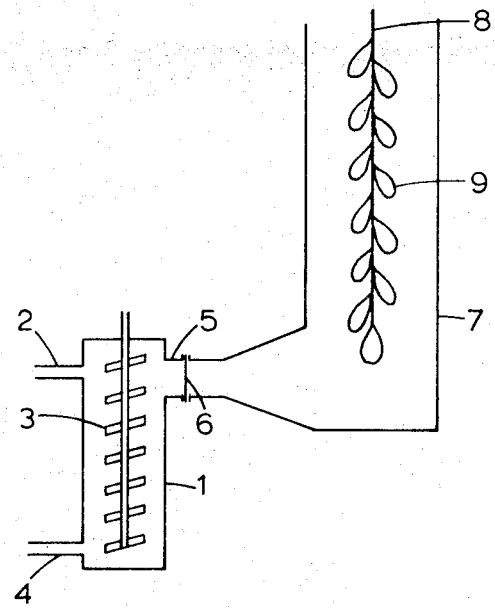
FIG. 1 represents a schematical longitudinal section of an installation according to the invention.

In FIG. 1, autoclave 1 is supplied, via line 2 at a pressure of about 1800 kg./cm.$^2$, with ethylene and an initiator yielding free radicals, such as ditertiary butyl peroxide. If desired, a comonomer, like vinyl acetate, vinyl propionate or acrylic acid, is added to the ethylene. With the aid of stirrer 3 the contents of the reactor are intimately mixed with the cold ethylene supply, the temperature being maintained to about 250° C. Under the conditions prevailing in the reactor polyethylene forms, which, together with a quantity of unconverted ethylene, is discharged from the reactor 1 via line 4. Line 4 is connected to a separator (not shown in the drawing) used for separating off the polymer formed. The heat set free during the polymerization is partly utilized for heating the ethylene supplied to the polymerization temperature and is partly discharged together with the mixture of ethylene and polyethylene leaving the reactor through line 4.

Nevertheless, as described above, it may happen that, locally, the temperature reaches the decomposition temperature of the ethylene present in the reactor and that this ethylene, and, possibly, the polymer formed decompose into carbon, hydrogen and methane, in which the temperature and the pressure in the reactor may increase strongly. If the pressure in the reactor should then rise above an allowable value, for instance 2500 kg./cm.$^2$, a rupture disc, 6, installed in line 5, will give way, so that the contents of the reactor issue into the atmosphere at a great velocity via outlet pipe 7. Of course, rupture disc connected with the outlet pipe via a connecting line may be installed in various places in the wall of the reactor. Further, also the separator may be provided with such a safety unit in view of a decomposition extending into the separator.

In outlet pipe 7 a chain, 8, has been fitted to which bags, 9, are fastened. The bags are made of low-density polyethylene, have a wall thickness of 0.1 mm. and are filled with 1 to 2 litres of water. The diameter of the rupture discs amounts, for instance, to 28 mm. and that of the outlet pipe to 600 mm. In the case given the gas will escape at an initial rate of 600 m./s. and a temperature of 1550° C. maximum and expand to a pressure of about 3 atm. immediately after the rupture disc. The wall of the bags will then melt or tear forthwith, so that the water from the bags is distributed in the escaping gas and withdraws heat therefrom by direct cooling and by evaporation.

Figure 2:
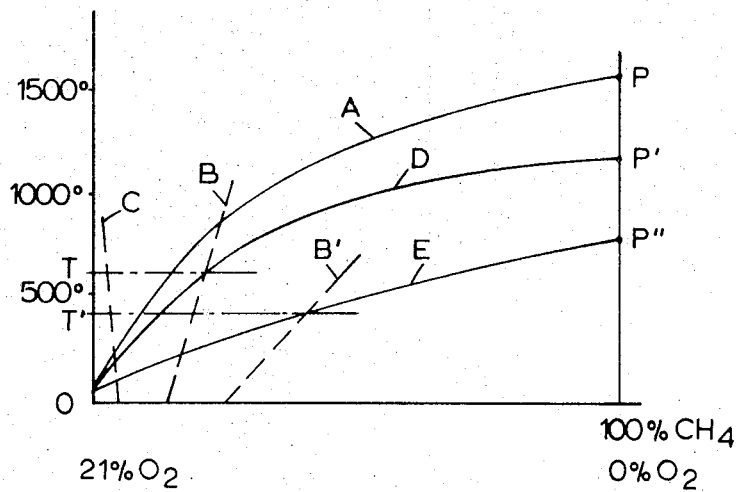
FIG. 2 shows the temperature curve of the issuing gas when mixing with air and with and without supply of water.

In the case of a decomposition the ethylene will mainly change into carbon and methane. In FIG. 2 the point P indicates the temperature of the methane when leaving the reactor. If this gas is mixed with air of 20° C. when issuing into the atmosphere, the temperature will decrease as indicated by line A. A mixture of methane and air is explosive in the area located between the lines B and C. If the temperature is in excess of about 600° C. a gas mixture within this area will explode spontaneously. At lower temperatures explosion occurs only if the gas mixture contacts a source of ignition. From FIG. 2 appears that line A intersects the area between the explosion limits B and C and above the temperature T=600° C. at which an explosion occurs spontaneously. By supplying the outlet pipe with 0.3 kg. of water of 20° C. per kg. of methane, this methane is cooled to such a degree that when issuing into the atmosphere its temperature amounts to 1200° C., as is indicated by point P'. If this gas is now mixed with air of 20° C., a temperature curve is obtained as indicated by line D, which passes through the explosion area just below the ignition temperature T.

In FIG. 2 the upper explosion limit for an ethylene-air mixture is presented by line B' and the ignition temperature by T'. This shows that if after a decomposition ethylene should issue through a line which has been heated by the hot methane, there is a risk of ignition of the ethylene after this has become mixed with air. By supplying the outlet pipe with a quantity of water of 0.8 kg. per kg. of the reactor contents, the ethylene is cooled to such an extent that it issues into the atmosphere at a temperature of 620° C. (point P''). The temperature curve represented by line E shows that the temperature of the ethylene-air mixture passes through the explosion area B'–C below the ignition temperature T'.

At a reactor volume of 250 l. and a density of the ethylene, at the conditions prevailing in the reactor, of 500 kg./m.$^3$, a water quantity of 37.5 litres will, theoretically, suffice to cool the gas below the ignition temperature of methane (line D). By supplying a two- to three-fold excess quantity, for instance 100 l., the risk of self-ignition of ethylene, issuing secondarily after a decomposition towards methane, is also excluded (line E). Further, as a result of the steam formation, the intensity of the sound produced by the breaking of rupture disc is strongly reduced.

Figure 3:
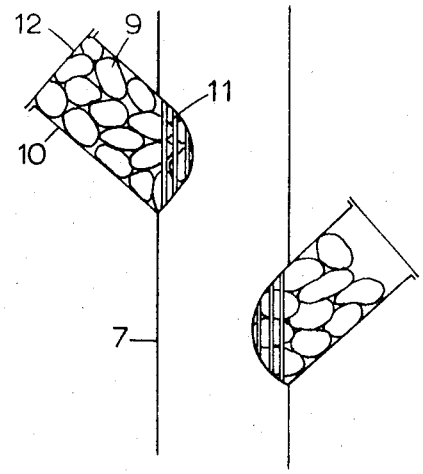
FIGS. 3 and 4 show modifications of the installation according to FIG. 1.

Seeing that after the first wave, gas will continue to issue for some time, water should also be added to the gas during this time. This can be achieved by accommodating the bags, according to the mode of realization shown in FIG. 3, in a tube section, 10, ending in the outlet pipe. At the point of connection between the tube section and the outlet pipe a grid, 11, is installed which prevents the bags from dropping into the outlet pipe. At the upper end the tube section is closed by means of a cover, 12, so that the gas cannot escape via the tube section. When the gas issues from the reactor the bags in the tube section will succomb. The water in the bags resting against the grid will flow practically immediately into the outlet pipe, to be followed at a later point of time by the water from the bags located further towards the rear, so that the water supply is spread over a certain period. If the length of the tube section is equal to the diameter, for instance 50 cm., this period amounts to approximately 3 seconds, and may be extended by not filling the tube section completely, as shown at the right in FIG. 3.

Figure 4:
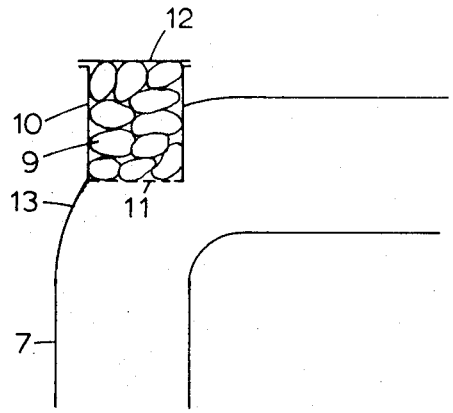

In the mode of realization according to FIG. 4, the tube section is installed at the top side of a bend, 13, in the outlet pipe, at the point where this pipe changes from a vertical part into a mainly horizontal part. Here, the water drops into the gas flow, so that a good distribution of the water in the gas flow is obtained. The modes of realization shown in the drawings may also be applied in combination.

Since the coolant is in an enclosed space, no measures need be taken to compensate evaporation losses. If there is a risk of freezing, an anti-freeze agent, like glycol, may be added to the water. Another possibility is for the tube sections to be provided with insulation or with means to heat the contents of the tube sections during frost.

Figure 5:
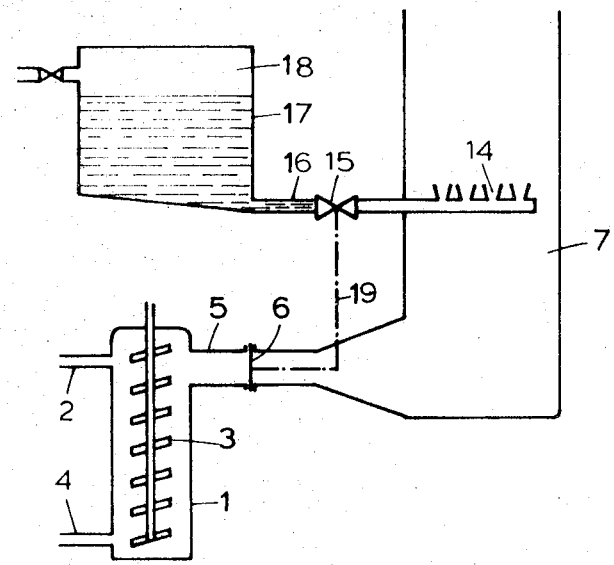
FIG. 5 is a schematical representation of a modified embodiment of the installation according to the invention.

In the embodiment shown in FIG. 5, sprays, 14, are mounted in outlet pipe 7 and connected with a water reservoir, 17, via line 16, which line is equipped with a valve, 15. Compartment 18 over the water level in said reservoir contains a compressed medium, e.g. compressed air having a pressure of 5 ats. g.

Rupture disc 6 is so coupled to valve 15 by means of a signal line, 19, that said valve will open as soon as rupture disc 6 succumbs. The water then flows out of reservoir 17, to be distributed in the issuing gas by the sprays 14.

Figure 6:
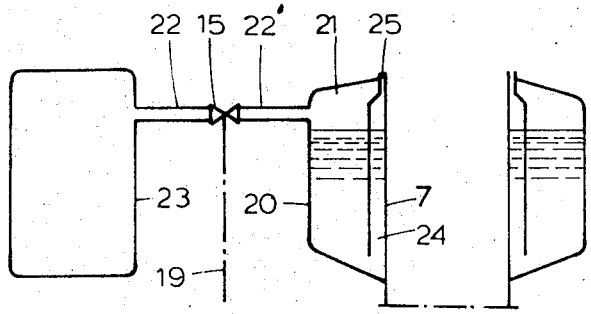
FIG. 6 shows modifications of the installation according to FIG. 5.

In the embodiment illustrated in FIG. 6 a water reservoir, 20, is arranged concentrically around the end of outlet pipe 7. Compartment 21 over the water level in said reservoir connects, via line 22, 22', with vessel 23 filled with compressed air. In this case, the quick-acting valve 15 is mounted in line 22, 22'. When the quick-acting valve opens, the pressure exerted by the compressed air (e.g. 5 ats. gauge) on the water level, drives the water out of reservoir 20 and causes it to flow via shell 24 around the outlet pipe to a spray aperture, 25. The spray aperture is designed as an annular slot surrounding the exit of outlet pipe 7. The gas cloud issuing from the pipe is thus surrounded by a water screen which shields the gas from the surroundings and gradually mixes with the gas, thereby cooling and diluting it to such a degree that the gas can no longer ignite. Vessel 23 may, of course, also be filled with another pressure medium, e.g. with nitrogen, while it is also possible to connect line 22 with a compressed-air system.

Figure 7:
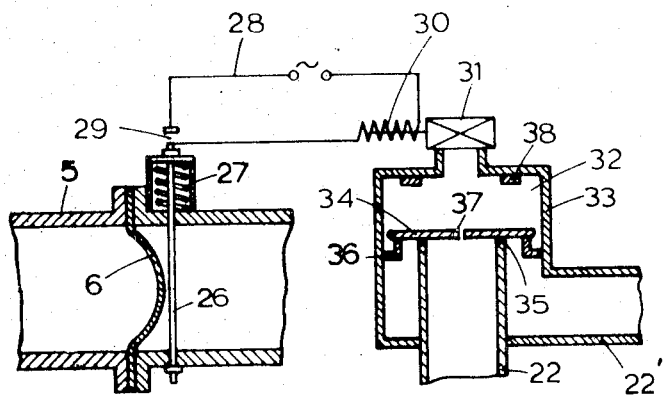
FIG. 7 shows the operating gear of this installation.

In the embodiment according to FIG. 7 a wire 26, tautened by spring 27, is installed behind rupture disc 6. When the rupture disc succumbs, wire 26 also breaks resulting in spring 27 being released and contact 29 in circuit 28 being closed. Wire 26 may also be made of a material that melts at the high temperature of the gas issuing from the reactor, which also results in breakage of the wire and closure of circuit 28. Circuit 28 includes a coil 30 which, upon closure of the circuit, is actuated and displaces a slide valve 31, so that compartment 32 over a plate-shaped valve, 34, in valve casing 33 is communicated with the surroundings. Valve 34 is supported on a seat 35, installed at the end of line 22 connecting with compressed-air vessel 23. The diameter of the valve being larger than that of seat 35, the valve extends beyond the wall of line 22. The part of the valve projecting beyond line 22 is supported on a seat, 36, mounted in the valve casing.

In valve 34 a small aperture, 37, is provided, so that, with slide valve 31 in the closed position, the pressure in compartment 32 equals the pressure in line 22. Since the valve area exposed to the pressure in compartment 32 is larger than the area on which the pressure in line 22 is exerted, the valve will be held down so firmly on the seats 35 and 36 that no air can flow from line 22 into line 22' connecting to compartment 21. If, however, upon displacement of slide valve 31, compartment 32 is connected to the surroundings, the pressure in compartment 32 will decrease, so that the valve will be lifted by the pressure in line 22 and be forced against a seat, 38, installed in the top part of the valve casing. The air can now freely flow through the lines 22 and 22' into compartment 21 over the water level in reservoir 20.

Slide valve 31, as well as valve 34, may be of a very light construction. This makes it possible, within a time lapse of 50 milliseconds after the rupture disc has succumbed, to create a large passage area between compressed-air reservoir 23 and compartment 21 in the liquid reservoir.

Figure 8:
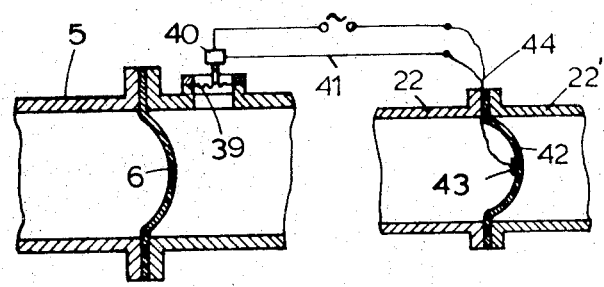
FIG. 8 represents a modified embodiment of said operating gear.

In the embodiment of FIG. 8 a diaphragm 39 is mounted in the wall of line 5, closely behind rupture disc 6. Upon breakage of the rupture disc, said diaphragm bends outwards under the influence of the pressure rise, thereby actuating a microswitch, 40, in such a way that a circuit, 41, is closed. Mounted in line 22, 22', is a rupture disc, 42, which carries an explosive charge, 43.

The charge is connected with an ignition line, 44, included in circuit 41. In this way it is achieved that, virtually immediately after rupture disc 6 has succumbed, a current is generated in line 44, which causes charge 43 to ignite. Rupture disc 42 will then be ripped open, so that a large passage area is created in line 22, 22'. Owing to the absence of mechanical parts, which invariably possess some inertia, the time lapse between the breakage of safety unit 6 and the opening of the shut-off in line 22, 22', is extremely short in this embodiment.

The invention is not limited to the embodiments described above. For example, behind rupture disc 6 a wire may be provided through which a continuous current is passed which is interrupted the moment the wire breaks as a result of the rupture disc succumbing. Succumbing of the rupture disc may also be established optically by means of a photoelectric cell, or thermally by means of a thermocouple or by application of a material that expands or melts at a temperature increase. Further, signalling may be done by a wireless procedure, using a transmitter installed near the safety unit and a receiver coupled to the quick-acting valve.

The valve in the sprinkler installation may also be directly operated by the issuing gas, in which case the gas itself acts as the signal transmitter.

Safety devices other than a rupture disc, e.g., a relief valve, may also be installed in outlet line 5. The safety device may furthermore be combined with a signalling unit for disconnecting the compressor and stopping the ethylene feed.

Substances that counteract algae growth and depress the freezing point may be added to the water. Freezing of the water may also be prevented by installing heating elements in the water reservoir, which elements, if the water temperature decreases below a given value, are cut in by a thermostat. In view of the freezing hazard it is further recommendable to provide the water reservoir with an insulating jacket. Furthermore, means may be provided for indicating and/or maintaining the height of the water level in the reservoir in order that a reduction of the water quantity caused by evaporation can be timely made up. To this end, the water reservoir may be equipped with an overflow and a feed line through which water is continuously pumped at a constant rate. It should then be seen to, however, that the resistance of the overflow line is so large that, upon actuation of the sprinkler system, the air cannot escape via said overflow line.

In conclusion, it is pointed out that the installation of a venturi in the outlet pipe, for the purpose aspirating the cooling water for dilution by the flow of the escaping gas itself, does not lead to the result envisaged, since any given venturi will operate properly only at a given temperature and a given flow velocity. Since during emptying of the reactor these quantities are subject to strong variation, it is not possible to so design such a venturi that at any moment the necessary amount of water will be aspirated by the gas.

The devices described above may be installed not only on the reactor but also in similar fashion on the separator in which the mixture issuing from the reactor is separated into monomer and polymer.

It will thus be understood that this invention can be employed generally in polymerization processes, carried out in both autoclaves and tubular reactors, for the polymerization of ethylenic monomers, particularly ethylenic monomers which are gaseous at normal ambient temperatures or which at least have high vapor pressures, particularly at the reaction temperature. For instance, if it is desired to prepare a copolymer of ethylene, a mixture of ethylene and a monomer copolymerizable with ethylene, e.g. an unsaturated ester like ethylacrylate, vinylacetate or vinylpropionate, an alkenic compound like propene and neo-hexene, or other compounds like acrylonitrile and vinylchloride, may be fed to the reactor. The proportion of ethylene in such a mixture is usually at least 50%. Similarly, the invention applies to processes for the polymerization of propylene or butylene, a butadiene, or copolymers thereof.

We claim:

1. In processes for the preparation of homo- and copolymers of ethylene, in which the ethylenic monomers are exposed to elevated temperatures and pressures in a reactor, in the presence of an initiator, and which reactor has provision for removal of at least part of the gaseous reactor contents along a route other than the normal discharge line, in the event an excessive pressure level is exceeded, via a safety passageway and outlet pipe that becomes operative at said pressure, the improvement to minimize the danger of aerial explosives which comprises introducing at least 0.3 kg. of water per kg. of the reactor contents into the gas issuing from the reactor through said passageway and pipe within 10 seconds of the time when said safety passageway becomes operative.

2. Process according to claim 1, wherein at least 0.8 kg. of water per kg. of said reactor contents is introduced into said gas issuing from the reactor.

References Cited

UNITED STATES PATENTS

| 3,509,115 | 4/1970 | French | 260—87.3 |
| 3,268,009 | 8/1966 | Bussey et al. | 169—2 R |
| 2,917,116 | 12/1959 | Wyant | 169—2 R |

JOSEPH L. SCHOFER, Primary Examiner

A. HOLLER, Assistant Examiner

U.S. Cl. X.R.

260—87.3, 87.5 C, 88.2 B, 93.7, 94.2 R, 94.9 P, 94.9 R

UNITED STATES PATENT OFFICE
CERTIFICATE OF CORRECTION

Patent No. 3,781,256     Dated December 25, 1973

Inventor(s) C.P. M. Sadee et al

It is certified that error appears in the above-identified patent and that said Letters Patent are hereby corrected as shown below:

Column 2, line 11 should read:

"$C_2H_4 \longrightarrow 2C + 2H_2 + 11$ kcal/mole;"

Column 3, lines 11 and 12 should read as follows:

"In the case of an aerial after decomposition towards $CH_4$ -- yields 7.2 kg of TNT/kg of $C_2H_4$".

Signed and sealed this 13th day of August 1974.

(SEAL)
Attest:

McCOY M. GIBSON, JR.
Attesting Officer

C. MARSHALL DANN
Commissioner of Patents